United States Patent [19]

Stenson

[11] 4,114,859
[45] Sep. 19, 1978

[54] FENCE STAPLE

[76] Inventor: Stanley E. Stenson, R.R. 1, Box 30, Covington, Mich. 49919

[21] Appl. No.: 765,248

[22] Filed: Feb. 3, 1977

[51] Int. Cl.² .................................................. B21F 27/00
[52] U.S. Cl. ............................................. 256/48; 85/49
[58] Field of Search ................. 256/47, 48, 54; 85/49, 85/71; 248/339; 174/159, 158 F; 52/579, 580

[56] References Cited

U.S. PATENT DOCUMENTS

| 275,435 | 4/1883 | Sweet, Jr. ........................... 85/49 UX |
| 420,635 | 2/1890 | Stieringer .............................. 174/159 |
| 607,410 | 7/1898 | Flanagan ......................... 256/47 UX |
| 1,574,790 | 3/1926 | Carroll ..................................... 85/49 |
| 1,877,274 | 9/1932 | Crowhurst ............................. 52/680 |
| 3,224,721 | 12/1965 | Malmquist ........................... 248/339 |
| 3,339,448 | 9/1967 | McKee .................................... 85/49 |
| 3,513,747 | 5/1970 | Dirks ................................. 248/339 X |

FOREIGN PATENT DOCUMENTS

| 221,061 | 11/1942 | Switzerland ................................. 85/49 |
| 6,333 of | 1891 | United Kingdom ....................... 256/48 |
| 1,410 of | 1880 | United Kingdom ....................... 256/48 |
| 956,737 | 4/1964 | United Kingdom ......................... 85/49 |

Primary Examiner—Andrew V. Kundrat
Attorney, Agent, or Firm—Vogel, Dithmar, Stotland, Stratman & Levy

[57] ABSTRACT

A fastener for mounting on a post to hold barbed wire in which an elongated member has an eye at one end and mounting means at the other end, the eye defines an enlarged opening for free movement of barbed wire therethrough and the fastener includes means for positioning the eye a predetermined distance from the associated post. Two embodiments are disclosed, one having a single shank with an open enlarged eye and a positioning washer. After barbed wire is positioned in the open enlarged eye, the eye is manually closed to trap the wire. The second embodiment is a staple for use with wood posts in which two prongs are provided with a reverse bend between an eye and the prongs, thereby limiting the distance that the fastener can be driven into the wood post to position the eye a predetermined distance from the post.

1 Claim, 5 Drawing Figures

FENCE STAPLE

BACKGROUND OF THE INVENTION

Even at this late date, there is a great need in farming to provide a fastener or staple for use with either metal or wood posts to accommodate barbed wire between a summer taut position and a winter loose position. The staple must be able to accommodate sliding movement of the barbed wire between the two positions while at the same time provide the required support in case animals or the like bump into the wire. Many staples have been suggested, such as those disclosed in U.S. Pat. No. 1,540,755, issued to Brady, June 9, 1925 and U.S. Pat. No. 631,138, issued to Timmons, Aug. 15, 1899. Both of these patents illustrate staples useful with barbed wire, but neither of the patents shows a staple of the type hereinafter described. The staple of the present invention provides means for positioning an enlarged eye a predetermined distance from the associated post and also provides means for easy passage of the barbed wire therethrough in combination with a staple of a design such that it is easy to handle in the field, inexpensive to make and is essentially one piece construction.

SUMMARY OF THE INVENTION

This invention relates to a fastener or staple for use with barbed wire and more particularly to a fastener or staple having an enlarged eye for free passage of barbed wire therethrough and means for positioning the enlarged eye with respect to an associated post.

It is an important object of the present invention to provide a fastener or staple for use with barbed wire which is easy to use and inexpensive to manufacture.

It is another object of the present invention to provide a fastener for mounting on a post to hold barbed wire, the fastener comprising an elongated member having an eye at one end and mounting means at the other end, the eye defining an enlarged opening for free movement of barbed wire therethrough, and means for positioning the eye a predetermined distance from the associated post, whereby mounting of the fastener on the associated post provides support for barbed wire passing therethrough while permitting free movement of barbed wire between a taut condition and a slack condition.

Another object of the present invention is to provide a fastener or staple of the type set forth in which the enlarged eye is initially open and is manually closed to entrap barbed wire after it has been positioned in the eye.

These and other objects of the present invention may be more readily understood when taken in connection with the foregoing specification and drawings, in which:

DESCRIPTION OF THE PREFERRED EMBODIMENT

Figure 5:
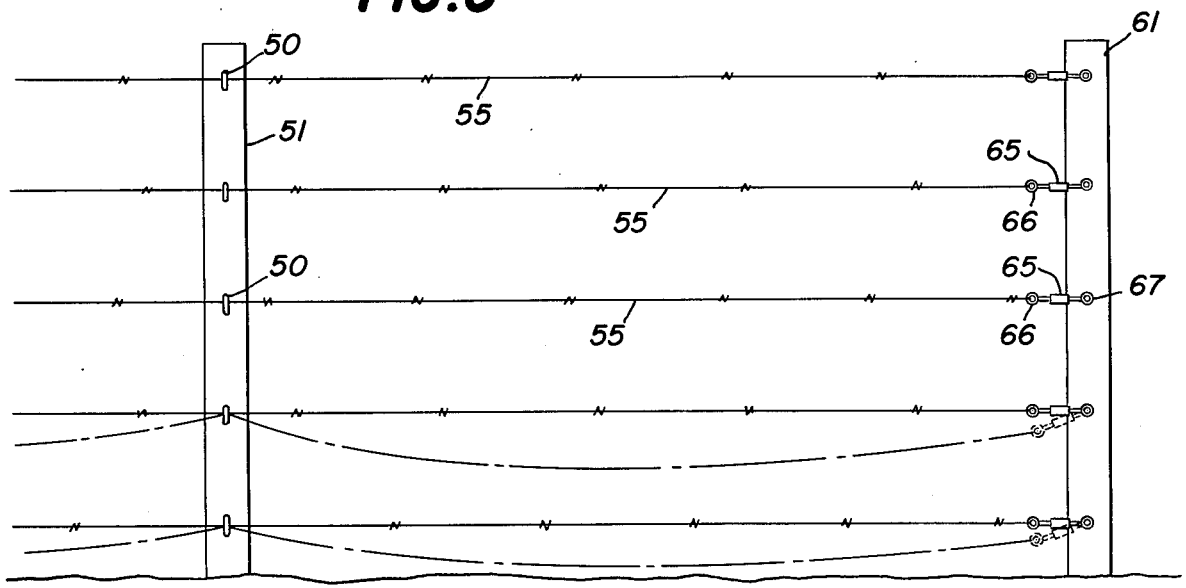
FIG. 5 is a side elevational view of the staples of the present invention used in connection with barbed wire and fence posts, showing the wire in the taut and slack conditions.

Referring now to the drawings, there is disclosed in FIG. 5 a plurality of staples 50 mounted in column configuration on an associated post 51. Barbed wire 55 passes through each of the staples 50 and forms a plurality of strands one above the other in spaced relation. An end post 61 has a plurality of turnbuckles 65 intermediate an eyelet 66 connected to the barbed wire strand 55 and a fastener means 67 connected to the associated post 61. Adjustment of the turnbuckle 65 results in barbed wire 55 being in the taut or full line condition for summer use or in the slack or phantom line position for winter storage.

Figure 1:
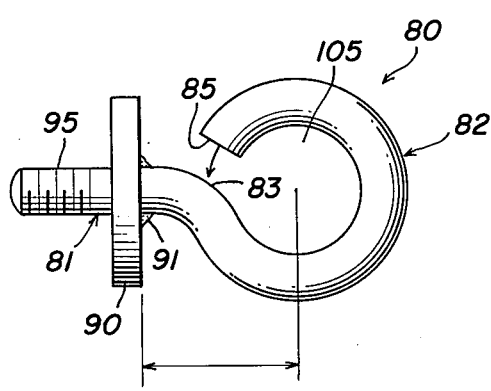
FIG. 1 is a side elevational view of a first embodiment of the present invention showing the staple having an open enlarged eye.
Figure 2:
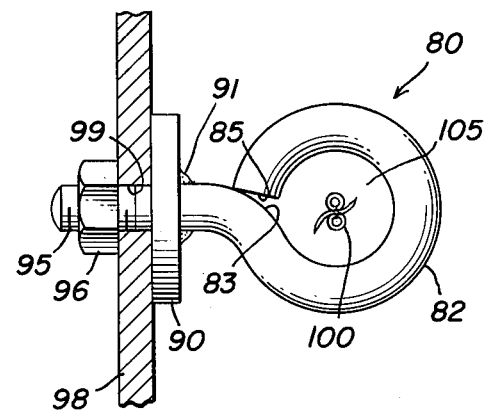
FIG. 2 is a side elevational view of the staple illustrated in FIG. 1 mounted on a metal post and having the eye closed to trap barbed wire therein.

Reference to FIGS. 1 and 2 is made for the staple 80 for use particularly with metal posts and the like. The staple 80 is formed from a single rod or wire and has an elongated mounting end 81 and arcuate eye 82. Intermediate the straight mounting portion 81 and the arcuate portion or eye 82, is a reverse bend portion 83, the arcuate portion or eye 82 terminating in an abutment surface 85. Mounted intermediate the reverse bend 83 and the mounting end 81 is a spacer or washer 90 fixedly mounted to the rod by means of welds 91. The mounting portion 81 of the staple 80 is provided with standard threads 95 and when mounted on an associated port 98 having an aperture therein has a nut 96 threadedly mounted on and in engagement with the post, thereby fixedly to secure the staple 80 to the post 98.

The washer 90 serves to position the eye 82 a predetermined distance from the post 98, and is an important aspect of the present invention, since it facilitates easy handling of the staple 80 in the field. After barbed wire 100 is inserted into the open eye 82, as illustrated in FIG. 1, and particularly into the space 105 defined by the arcuate portion 82, the eyelet is closed as shown in FIG. 2, thereby to trap the barbed wire 100 in the enlarged space 105. Closing of the staple 80 is accomplished by pliers or other standard tools, and as seen in FIG. 2 causes the end 85 to abut and come in contact with the reverse bend 83 thereby to trap the barbed wire 100 within the space 105 of the eye 82.

Figure 3:
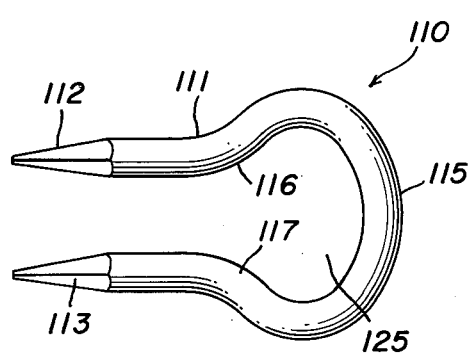
FIG. 3 is a side elevational view of a second embodiment of the present invention showing a staple for use with a wooden fence post.
Figure 4:
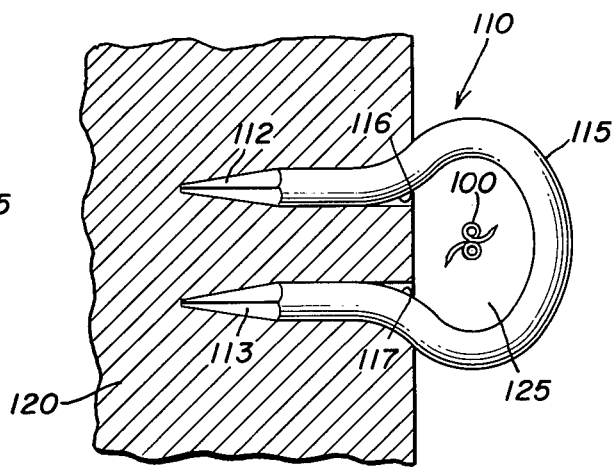
FIG. 4 is a side elevational view of the staple shown in FIG. 3 mounted on a wooden post.

Referring now to FIGS. 3 and 4, there is shown a second embodiment 110 of the present invention for use particularly with the wood post 120. The staple 110 is formed of an elongated rod or wire member 111 in which mounting prongs 112 and 113 are formed on the ends of the elongated member 111. Prongs 112 and 113 are connected by reverse bends 116 and 117 respectively to an arcuate portion 115 which defines an enlarged area 125 intermediate the arcuate portion 115 and the reverse bends 116 and 117. Reference to FIG. 4 shows that the reverse bends 116 and 117 act as positioning means to limit and define the distance of the arcuate portion of the eye 115 from the associated fence post 120, it being noted that the staple 110 can be driven into the post 120 only as far as the reverse bends 116 and 117, the bends preventing further driving of the staple 115 into the post. Accordingly, the enlarged area 125 is preserved and maintained by cooperation of the reverse bends 116 and 117 and the arcuate portion or eye 115 of the staple 110. Barbed wire 100 is free to move within the enlarged area 125 in the same manner as in the enlarged area 105.

Two-strand, four barbed wire is useful in farming and is accommodated by the staples 80 and 110 of the present invention. In field use, barbed wire 100 of the type described freely passes through both staples 80 and 110 between the taut or full line condition shown in FIG. 5 and the slack or phantom line condition in FIG. 5. Both of the staples 80 and 110 are easy to use in the field and are inexpensive to manufacture. Both of the staples are essentially one-piece construction and perform satisfactorily in practice. The positioning means of each staple 80 and 110 ensure accurate placement of the staple without any difficulty in the field. Both embodiments 80 and 110 are easy to use and inexpensive to manufacture.

While there has been described what at present is considered to be the preferred embodiment of the present invention, it will be appreciated that various modifications and alterations may be made therein without varying from the true spirit and scope of the present invention and it is intended to cover in the appended claims all such variations and modifications.

What is claimed is:

1. A fastener mounted on each of a plurality of wooden posts to hold barbed wire, a pair of straight substantially parallel spaced-apart shanks each sharpened at one end thereof and driven into said wooden post in a plane parallel to the post and straddling said wire, each of said shanks being integral at the other end thereof with a curved shoulder portion extending laterally outwardly in a direction away from the other one of said shanks, each shoulder portion including a first portion having a large radius of curvature centered outside the associated leg and a second portion having a small radius of curvature centered inside the associated leg, and an arcuate bight portion integral with and interconnecting said second portions of said curved shoulder portions and having a large radius of curvature centered between said legs for defining with the post an enlarged substantially elliptical opening having its minimum dimension in said plane greater than the lateral distance between said shanks and proportioned for accommodating free movement of two strand, four barbed wire therethrough, while said curved shoulder portions limit the distance that said shanks can be driven into the associated post for maintaining the uniformity of said enlarged opening whereby mounting of said fastener on the associated post provides support for said barbed wire passing therethrough yet permits free movement of the barbs as the wire is moved between a taut and a slack condition.

* * * * *